United States Patent [19]

Gupta et al.

[11] Patent Number: 4,983,266

[45] Date of Patent: Jan. 8, 1991

[54] CURABLE COATING COMPOSITIONS COMPRISING SELF-CROSSLINKABLE COMPONENTS

[75] Inventors: Goutam Gupta, Homewood; Sherman J. Mels, Flossmoor, both of Ill.

[73] Assignee: The Sherwin-Williams Company, Cleveland, Ohio

[21] Appl. No.: 290,620

[22] Filed: Dec. 27, 1988

[51] Int. Cl.$^5$ .............................................. C25D 13/06
[52] U.S. Cl. ................................. 204/181.7; 523/412; 523/413; 524/901; 525/328.8; 525/450; 525/454; 528/287; 528/288; 528/293; 528/295
[58] Field of Search ..................... 204/181.7; 523/404, 523/409, 411–415; 525/328.8, 450, 454; 528/287, 288, 293, 295

[56] References Cited

U.S. PATENT DOCUMENTS

| | | | |
|---|---|---|---|
| 4,405,662 | 9/1983 | Raudenbusch | 523/414 |
| 4,423,167 | 12/1988 | Valko | 523/414 |
| 4,423,168 | 12/1983 | Valko | 523/414 |
| 4,423,169 | 12/1988 | Valko | 523/414 |
| 4,427,805 | 1/1984 | Kooijmans et al. | 523/417 |
| 4,440,612 | 4/1984 | Valko | 204/181 |
| 4,489,182 | 12/1984 | Valko | 523/414 |
| 4,491,611 | 1/1985 | Barnhoorn et al. | 427/386 |
| 4,511,447 | 4/1985 | Valko | 204/181 C |
| 4,542,173 | 9/1985 | Schupp | 523/414 |
| 4,769,400 | 9/1988 | Geist | 523/411 |

FOREIGN PATENT DOCUMENTS 0012463 11/1979 European Pat. Off.
2102430 2/1983 United Kingdom .

OTHER PUBLICATIONS

U.S. Ser. No. 07/290,213; filed 12-27-88; Gupta; Curable Coating Compositions Comprising Crosslinked Components.

Primary Examiner—John F. Niebling
Assistant Examiner—Ben C. Hsing
Attorney, Agent, or Firm—Steven W. Tan; Robert E. McDonald

[57] ABSTRACT

This invention relates to an electrodeposition process which comprises electrodepositing onto a conducting substrate a coating composition comprising a self-crosslinking polymeric resin which has an average of at least two pendent hydroxy functional groups and an average of at least two pendent ester groups of the general formula:

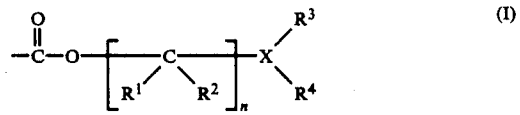

wherein $R^1$ and $R^2$ are independently hydrogen, alkyl, substituted alkyl or aryl groups; n is from about 1 to about 5; X is nitrogen, sulfur or phosphorus; and when X is nitrogen or phosphorus, $R^3$ is hydrogen, lower alkyl, or an aryl group; $R^4$ is lower alkyl or an aryl group; and when X is sulfur, $R^4$ is nothing and $R^3$ is either hydrogen, lower alkyl or aryl.

6 Claims, No Drawings

CURABLE COATING COMPOSITIONS COMPRISING SELF-CROSSLINKABLE COMPONENTS

BACKGROUND OF THE INVENTION

1. Field of the Invention

This invention relates to an electrodeposition process which comprises electrodepositing onto a conducting substrate a coating composition comprising a self-crosslinking polymeric resin which has an average of at least two pendent hydroxy functional groups and an average of at least two pendent ester groups of the general formula:

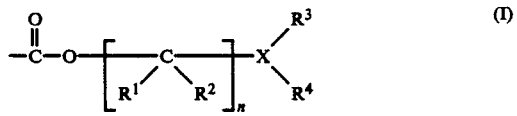

wherein $R^1$ and $R^2$ are independently hydrogen, alkyl, substituted alkyl or aryl groups; n is from about 1 to about 5; X is nitrogen, sulfur or phosphorus; and when X is nitrogen or phosphorus, $R^3$ is hydrogen, lower alkyl, or an aryl group; $R^4$ is lower alkyl or an aryl group; and when X is sulfur, $R^4$ is nothing and $R^3$ is either hydrogen, lower alkyl or aryl.

2. Description of the Art

Methods of crosslinking hydroxy functional polymers or polymeric polyols with esters are known. For example, U.S. Pat. No. 4,423,167 teaches coating compositions formed by transesterifying a polymeric polyol with a polyester crosslinking agent having at least two beta-alkoxyester groups per molecule. Similarly, U.S. Pat. No. 4,440,612 teaches a method of coating a conductive substrate using the composition of U.S. Pat. No. 4,423,167. U.S. Pat. No. 4,489,182 teaches coating compositions formed by transesterifying a polymeric polyol with a polyester crosslinking agent having at least two gamma and/or delta-hydroxyester groups per molecule. U.S. Pat. No. 4,511,447 teaches a method of coating a conductive substrate using the composition of U.S. Pat. No. 4,489,182. U.S. Pat. No. 4,423,169 teaches coating compositions formed by transesterifying a polymeric polyol with a polyester crosslinking agent having at least two beta-carboxyalkyl and/or gamma-carboxyalkyl ester groups per molecule. U.K. Patent Application No. GB 2 102 430 A teaches coating compositions formed by transesterifying a polymeric polyol with a polyester crosslinking agent having at least two ester groups per molecule, selected from the group consisting of beta-alkoxyester, beta-carboxyalkyl, beta-amido, gamma-hydroxy, gamma-carboxyalkyl, and delta-hydroxy groups. European Patent Application No. 0 012 463 A1 teaches thermosetting resinous binders useful as coating compositions comprising a hydroxy-functional polymeric resin and a polyester crosslinking agent having at least two beta-hydroxyl ester groups per molecule. U.S. Pat. No. 4,427,805 teaches thermosetting binder compositions comprising a hydroxy-functional polymeric resin and a polyester crosslinking agent having at least two beta-hydroxyl ester groups per molecule. U.S. Pat. No. 4,491,611 teaches catalytically self-crosslinking resinous binders prepared by addition reaction of a primary amine to a beta-hydroxyalkyl unsaturated ester followed by reaction of this amino adduct with an epoxy resin to produce a resin having both hydroxy functionality and beta-hydroxyalkyl ester groups.

In each of the above prior art patents, the crosslinking mechanism is promoted by an activation of the reactive ester group. This is accomplished through interaction with the available electron pair on the neighboring oxygen atoms from the beta- or gamma-hydroxy or alkoxy group. The degree of activation is directly proportional to the degree of the availability of the electron pair, i.e. nucleophilicity, from the activating oxygen. The nucleophilicity of oxygen in the prior art is low compared to the nucleophilicity of nitrogen, sulfur or phosphorus, consequently, the magnitude of activation provided by oxygen is lower, and the result is the need for generally higher crosslinking temperatures than those needed by the present invention.

The present invention relates to an electrodeposition process which comprises electrodepositing onto a conducting substrate a coating composition comprising a self-crosslinking polymeric resin which has an average of at least two pendent hydroxy functional groups and an average of at least two pendent ester groups of the general formula:

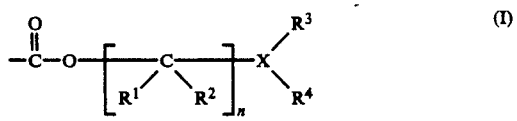

wherein $R^1$ and $R^2$ are independently hydrogen, alkyl, substituted alkyl or aryl groups; n is from about 1 to about 5; X is nitrogen, sulfur or phosphorus; and when X is nitrogen or phosphorus, $R^3$ is hydrogen, lower alkyl, or an aryl group; $R^4$ is lower alkyl or an aryl group; and when X is sulfur, $R^4$ is nothing and $R^3$ is either hydrogen, lower alkyl or aryl.

SUMMARY OF THE INVENTION

This invention relates to an electrodeposition process which comprises electrodepositing onto a conducting substrate a coating composition comprising a self-crosslinking polymeric resin which has an average of at least two pendent hydroxy functional groups and an average of at least two pendent ester groups of the general formula:

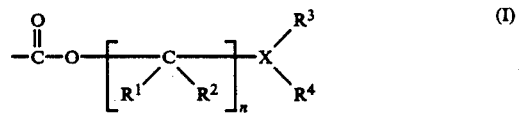

wherein $R^1$ and $R^2$ are independently hydrogen, alkyl, substituted alkyl or aryl groups; n is from about 1 to about 5; X is nitrogen, sulfur or phosphorus; and when X is nitrogen or phosphorus, $R^3$ is hydrogen, lower alkyl, or an aryl group; $R^4$ is lower alkyl or an aryl group; and when X is sulfur, $R^4$ is nothing and $R^3$ is either hydrogen, lower alkyl or aryl.

Accordingly, it is an object of this invention to describe a novel electrodeposition process.

It is another object of this invention to describe an electrodeposition process which utilizes a self-crosslinking polymeric resin.

It is another object of this invention to describe an electrodeposition process which eliminates the need for separate crosslinking agents.

These and other objects of this invention will be apparent from the detailed description which follows.

DETAILED DESCRIPTION OF THE INVENTION

Transesterification is the process whereby an ester and an alcohol exchange alkyl groups to form a new ester and a new alcohol. The general reaction is as follows:

$$RCOOR^1 + R^2OH \rightleftharpoons RCOOR^2 + R^1OH$$

The reaction has the potential to crosslink hydroxy functional polymeric resins. However, normal carboxylic esters do not have sufficient reactivity to undergo ester exchange with hydroxy functional compounds at temperatures low enough to be of interest in low bake cure systems. The concept of increasing the reactivity of a functional group through interaction with another strategically placed proximate group is well known and is generally referred to as "neighboring group participation". Normal unactivated carboxylic esters should be able to be transformed into esters with higher reactivity by using the neighboring group participation concept. The esters described by the art above all increase the reactivity of the ester group through interaction with a lone electron pair from oxygen. Each of those esters then possesses sufficient reactivity to transesterify with the specific hydroxy functional compounds disclosed at temperatures lower than those possible without such activation. If there are two or more activated ester groups per crosslinking agent molecule, and if there are two or more hydroxy groups per polymer molecule, the activated esters can effectively crosslink the hydroxy functional composition. Likewise, if one single molecule contains both hydroxy functionality and an activated ester group, the potential exists for self-crosslinking.

As stated above, the prior art patents promote the activation of the reactive ester through interaction with the activating oxygen's available electron pair. The present invention, however, promotes the activation of the reactive ester through interaction with atoms which are more nucleophilic than oxygen, namely nitrogen, sulfur and phosphorus. The advantage derived through this difference is that reactive esters with higher degrees of activation are obtained, and thus, cross-linking temperatures lower than those of the prior art are achievable.

Self-Crosslinking Polymeric Resin

The polymeric resins of this invention have the ability to self-crosslink. That is, each molecule contains both the hydroxy functionality and the activated ester functionality necessary to crosslink. The term "self-crosslink" can be interpreted to mean one molecule crosslinking with itself; however, the predominant mechanism to which the term refers is the crosslinking of one molecule with a second similarly configured molecule without the need for a separate crosslinking agent (such as an isocyanate).

In general, each molecule contains an average of at least two hydroxy functional groups and an average of at least two ester groups of the general formula:

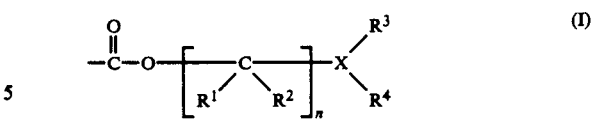

wherein $R^1$ and $R^2$ are independently hydrogen, alkyl, substituted alkyl or aryl groups, preferably hydrogen or methyl groups; n is from about 1 to about 5, preferably about 2; X is nitrogen, sulfur or phosphorus, preferably nitrogen; and when X is nitrogen or phosphorus, $R^3$ is hydrogen, lower alkyl, or an aryl group, preferably hydrogen, methyl, or ethyl groups; $R^4$ is lower alkyl or an aryl group, preferably methyl or an ethyl group; and when X is sulfur, $R^4$ is nothing and $R^3$ is either hydrogen, lower alkyl or aryl, preferably hydrogen, methyl or ethyl.

The polymeric compounds which are useful in the practice of this invention have an average of at least about two hydroxyl groups per molecule. It is preferred to utilize hydroxy functional monomers such as polyethers, polyesters, acrylics, polyurethanes, polycaprolactones, and the like.

In order to provide the fastest rate of reaction during cure it is preferred in the practice of this invention to utilize hydroxy-functional monomers having predominantly, and preferably all, primary hydroxyl functionality.

Representative hydroxy-functional reactants include those described below:

Polyether polyols are well known in the art and are conveniently prepared by the reaction of a diol or polyol with the corresponding alkylene oxide. These materials are commercially available and may be prepared by a known process such as, for example, the processes described in *Encyclopedia of Chemical Technology*, Volume 7, pages 257-262, published by Interscience Publishers, Inc., 1951; and in Kirk-Othmer *Encyclopedia of Chemical Technology*, Volume 18, pages 638,641, published by Wiley-International, 1982. Representative examples include the polypropylene ether glycols and polyethylene ether glycols such as those marketed as Niax ® Polyols from Union Carbide Corporation.

Another useful class of hydroxy-functional reactants are those prepared by condensation polymerization reaction techniques as are well known in the art. Representative condensation polymerization reactions include polyesters prepared by the condensation of polyhydric alcohols and polycarboxylic acids or anhydrides, with or without the inclusion of drying oil, semi-drying oil, or non-drying oil fatty acids. By adjusting the stoichiometry of the alcohols and the acids while maintaining an excess of hydroxyl groups, hydroxy-functional polyesters can be readily produced to provide a wide range of desired molecular weights and performance characteristics.

The polyester polyols are derived from one or more aromatic and/or aliphatic polycarboxylic acids, the anhydrides thereof, and one or more aliphatic and/or aromatic polyols. The carboxylic acids include the saturated and unsaturated polycarboxylic acids and the derivatives thereof, such as maleic acid, fumaric acid, succinic acid, adipic acid, azelaic acid, and dicyclopentadiene dicarboxylic acid. The carboxylic acids also include the aromatic polycarboxylic acids, such as phthalic acid, isophthalic acid, terephthalic acid, etc.

Anhydrides such as maleic anhydride, phthalic anhydride, trimellitic anhydride, or Nadic Methyl Anhydride (brand name for methylbicyclo[2.2.1]heptene-2,3-dicarboxylic anhydride isomers) can also be used.

Representative saturated and unsaturated polyols which can be reacted with the carboxylic acids to produce hydroxy-functional polyesters include diols such as ethylene glycol, dipropylene glycol, 2,2,4-trimethyl 1,3-pentanediol, neopentyl glycol, 1,2-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetramethylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, and polyols such as trimethylolethane, trimethylolpropane, trimethylolhexane, triethylolpropane, 1,2,4-butanetriol, glycerol, pentaerythritol, dipentaerythritol, etc.

Typically, the reaction between the polyols and the polycarboxylic acids is conducted at about 120° C. to about 200° C. in the presence of an esterification catalyst such as dibutyl tin oxide.

Additionally, hydroxy-functional reactants can be prepared by the ring opening reaction of epoxides and/or polyepoxides with primary or, preferably, secondary amines or polyamines to produce hydroxy-functional polymers. Representative amines and polyamines include ethanol amine, N-methylethanol amine, dimethyl amine, ethylene diamine, isophorone diamine, etc. Representative polyepoxides include those prepared by condensing a polyhydric alcohol or polyhydric phenol with an epihalohydrin, such as epichlorohydrin, usually under alkaline conditions. Some of these condensation products are available commercially under the designations EPON or DRH from Shell Chemical Company, and methods of preparation are representatively taught in U.S. Pat. Nos. 2,592,560; 2,582,985 and 2,694,694.

Other useful hydroxy-functional reactants can be prepared by the reaction of at least one polyol, such as those representatively described above, with polyisocyanates to produce hydroxy-functional urethanes. Representative polyisocyanates having two or more isocyanate groups per molecule include the aliphatic compounds such as ethylene, trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 3-isocyanatomethyl-3,5,5-trimethylcyclohexylisocyanate, and the 1,3-cyclopentane, 1,3-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, or mixtures thereof, 4,4'-toluidine, and 1,4-xylylene diisocyanates; the nuclear substituted aromatic compounds such as dianisidine diisocyanate, 4,4'-diphenylether diisocyanate and chlorodiphenylene diisocyanate; the triisocyanates such as triphenyl methane-4,4',4''-triisocyanate, 1,3,5-triisocyanate benzene and 2,4,6-triisocyanate toluene; and the tetraisocyanates such as 4,4'-diphenyldimethyl methane-2,2'-5,5'-tetraisocyanate; the polymerized polyisocyanates such as tolylene diisocyanate dimers and trimers, and other various polyisocyanates containing biuret, urethane, and/or allophanate linkages. The polyisocyanates and the polyols are typically reacted at temperatures of 25° C. to about 150° C. to form the hydroxy-functional polymers.

Useful hydroxy-functional reactants can also be conveniently prepared by free radical polymerization techniques such as in the production of acrylic resins. The polymers are typically prepared by the addition polymerization of one or more monomers. At least one of the monomers will contain, or can be reacted to produce, a reactive hydroxyl group. Representative hydroxy-functional monomers include 2-hydroxyethyl acrylate, 2-hydroxypropyl acrylate, 4-hydroxybutyl methacrylate, 2-hydroxypropyl methacrylate, 3-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetraethylene glycol acrylate, para-vinyl benzyl alcohol, etc. Typically the hydroxy-functional monomers would be copolymerized with one or more monomers having ethylenic unsaturation such as styrene, methyl, ethyl, butyl, lauryl, isobornyl, 2-ethylhexyl, acrylates and methacrylates, and the like.

In addition to the hydroxy functionality described above, each molecule contains an average of at least two ester groups of the general formula:

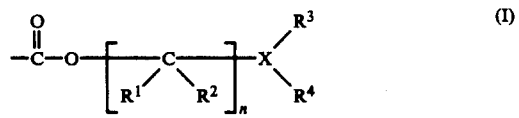

wherein $R^1$ and $R^2$ are independently hydrogen, alkyl, substituted alkyl or aryl groups; n is from about 1 to about 5; X is nitrogen, sulfur or phosphorus; and when X is nitrogen or phosphorus, $R^3$ is hydrogen, lower alkyl, or an aryl group; $R^4$ is lower alkyl or an aryl group; and when X is sulfur, $R^4$ is nothing and $R^3$ is either hydrogen, lower alkyl or aryl.

One particularly preferred monomer which contains an acceptable activated ester group is dimethylaminoethylmethacrylate (DMAEM). DMAEM has the general formula:

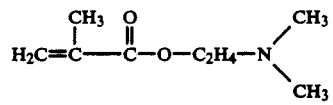

This monomer is free radical addition polymerized into the polymer chain via its ethylenic unsaturation to provide dimethylaminoethyl ester groups to the molecule.

The polymers are conveniently prepared by conventional free radical addition polymerization techniques. Frequently, the polymerization will be catalyzed by conventional initiators known in the art to generate a free radical such as azobis(isobutyronitrile), cumene hydroperoxide, t-butyl perbenzoate, etc. Typically, the unsaturated monomers are heated in the presence of the free radical initiator at temperatures ranging from about 35° C. to about 200° C., and especially 100° C. to 160° C., to effect the polymerization. The molecular weight of the polymer can be controlled, if desired, by the monomer selection, reaction temperature and time, and/or the use of chain transfer agents as is well known in the art. Preferably the polymer will have a number average molecular weight of at least about 400. Typical number average molecular weights will range from about 400 to about 30,000, and especially 1,000 to about 15,000.

Especially preferred in the practice of this invention are hydroxy-functional polyesters and hydroxy-functional acrylic polymers which also have the dimethylamino ethyl ester groups. An especially preferred polymer is the addition polymerization reaction product of (a) a hydroxy-functional ethylenically unsaturated monomer, (b) at least one ethylenically unsaturated monomer copolymerizable with the hydroxy-functional monomer, and (c) DMAEM. The ratio of active ester functionality to hydroxy functionality can vary between about 10:1 and 1:10 respectively, with a preferred ratio between 4:1 and 1:4, and a ratio around 1:1 most preferred.

The resin composition is most preferably dissolved or dispersed in a suitable solvent. If the resin composition is a low viscosity liquid, it can be used as is or it can be diluted. If present as a higher viscosity liquid, or as a solid, the resin can be diluted to a desired thickness.

Generally, for lacquer or conventional paint formulations, the resin composition is dissolved in organic solvent and applied to the substrate to be coated using conventional methods such as brush, roller, spraying, dipping, and the like.

Generally, for cathodic deposition applications, the resin composition is dispersed in an aqueous solvent. Suitable solvents include water, and water in combination with other water miscible solvents. The concentration of resin in the solvent depends largely on the process parameters to be used, and is in general not critical. In the case of cathodic electrodeposition, generally a major proportion of the aqueous composition will normally be solvent, e.g., the composition may contain from about 1 to about 75 percent, typically from about 1 to about 50 percent by weight solid with the remainder being solvent.

To make the resin more soluble in aqueous solutions, it will generally be necessary to partially or completely neutralize the resin with acid, preferably an organic acid, such as formic acid, acetic acid, citric acid or lactic acid. In general, the amount of acid needed is from about 20 percent to about 100 percent of the nitrogen functionality of the resin.

In most instances, a pigment composition and, if desired, various additives such as catalysts, flow agents, dispersants, solvents, and other materials may be included in the coating composition. The pigment composition may be of any conventional type, comprising, for example, one or more pigments such as iron oxides, lead oxides, strontium chromate, carbon black, titanium dioxide, talc, barium sulfate, zinc oxide, cadmium yellow, cadmium red, chromic yellow and the like.

In electrodeposition processes employing the aqueous coating composition described herein, the aqueous composition is placed in contact with an electrically conductive anode and an electrically conductive cathode, with the surface to be coated being the cathode. Upon passage of electric current between the anode and the cathode, while in contact with the bath containing the coating composition, an adherent film of the coating composition is deposited on the cathode. The applied voltage may be varied greatly within the practice of this invention for electrodeposition and can be, for example, as low as 1 volt or as high as several thousand volts, although typically between 50 volts and 500 volts. The current density is usually between 1 ampere and 15 amperes per square foot, and tends to decrease during electrodeposition.

The electrodeposition method is applicable to the coating of any electrically conductive substrate, and especially metal such as steel, aluminum, copper, or surfaces which have been coated with conductive primers or filaments to impart a conductive surface.

After application by whatever means desired, the coating is cured at elevated temperatures by any convenient method such as in baking ovens or with banks of infared heat lamps. Curing temperatures are preferably from about 150° F. to about 450° F. although somewhat higher or lower temperatures can be employed. During curing, the transesterification takes place.

The transesterification reaction generally requires the presence of a catalyst. In normal transesterification reactions, the catalyst can be either acid or base. In the present invention, preferred catalysts are the salts and/or complexes of metals such as lead, zinc, iron, tin and manganese. These catalysts are known in the art and include 2-ethylhexonates, naphthanates, and acetyl acetonates. Two particularly preferred transesterification catalysts are butyltin trishexanoate and dibutyltin oxide. The amount of catalyst generally varies from about 0.1 to about 2.0, preferably from about 0.2 to about 1.0 percent by weight based upon the total weight solids of the coating composition.

The following examples have been selected to illustrate specific embodiments and practices of advantage to a more complete understanding of the invention. Unless otherwise stated, "parts" means parts by weight.

EXAMPLE 1

| Resin | Styrene | DMAEM | HEA | BA | MMA |
|---|---|---|---|---|---|
| A | 25.0% | 10.0% | 20.0% | 45.0% | 0.0% |
| B | 33.7 | 10.0 | 20.0 | 31.5 | 5.0 |
| C | 49.5 | 10.0 | 20.0 | 10.5 | 10.0 |
| D | 23.8 | 14.3 | 19.1 | 42.9 | 0.0 |
| E | 49.5 | 20.0 | 20.0 | 0.0 | 10.5 |

All percentages are by weight
DMAEM=Dimethylaminoethylmethacrylate
HEA=Hydroxyethyl acrylate
BA=Butyl acrylate
MMA=Methyl methacrylate Resins are prepared by charging a polymerization reactor equipped with a mechanical stirrer, a water cooled condenser, nitrogen inlet, water trap, thermometer, heating mantle and fluid metering pump with 2-butoxy ethanol and heating the reactor to about 250° F. A mixture of the above, along with a free radical initiator such as Vazo 64 (2,2,-azobis-isobutyronitrile) is then added to the reactor over a three to four hour period. The temperature is maintained at about 250° F. while water is continuously withdrawn from the reactor. The temperature is maintained for about two hours after the addition is complete and then cooled for about one hour.

Samples of five resins prepared according to the above procedure (Resins A through E) were drawn down on steel panels and baked at various temperatures for 20 minutes. The cure temperature was determined to be that temperature which yielded a cured film which would resist 200 or more Methyl Ethyl Ketone (MEK)

rubs before being removed from the steel panel surface. Results are as follows:

| Resin | Catalyst | Cure Temperature |
|-------|----------|------------------|
| A | FastCat 4102 | 375° F. |
| B | DBTO | 350° F. |
| C | DBTO | 350° F. |
| D | DBTO | 330° F. |
| E | DBTO | 335° F. |

FastCat 4102=butyltin trishexanoate
DBTO=Dibutyltin oxide

The invention claimed is:

1. A method of electrocoating an electrically conductive surface serving as a cathode by passing an electrical current through an electrical circuit comprising said cathode, an anode, and an aqueous electrodepositable composition in contact with said cathode and said anode; wherein said electrodepositable composition comprises:
   (a) an aqueous solvent;
   (b) a self-crosslinking polymeric resin which has an average of at least two pendent hydroxy functional groups and an average of at least two pendent:

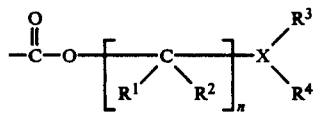

groups, wherein $R^1$ and $R^2$ are independently hydrogen, alkyl, substituted alkyl, or aryl groups; n is from about 1 to about 5; X is nitrogen, sulfur or phosphorus; and X is nitrogen or phosphorus, $R^3$ is hydrogen, lower alkyl, or an aryl group; $R^4$ is lower alkyl or an aryl group; and when X is sulfur, $R^4$ is nothing and $R^3$ is either hydrogen, methyl or ethyl; and
   (c) a catalytic amount of a transesterification catalyst.

2. The method of electrocoating of claim 1 wherein the electrodepositable coating composition further comprises a ratio of activated ester functionality to hydroxy functionality of between 10:1 and 1:10.

3. The method of electrocoating of claim 2 wherein in said self-crosslinking polymeric resin, X is nitrogen.

4. The method of electrocoating of claim 3 wherein in said self-crosslinking polymeric resin, $R^1$ and $R^2$ are independently hydrogen or methyl groups, n is from about 1 to about 3, and $R^3$ is hydrogen, methyl or an ethyl group; and $R^4$ is methyl or an ethyl group.

5. The method of electrocoating of claim 4 wherein said self-crosslinking polymeric resin comprises the free radical addition polymerization product of:
   (a) at least one hydroxy functional monomer selected from the group consisting of 2-hydroxyethyl acrylate, 2-hydroxypropyl acrylate, 4-hydroxybutyl methacrylate, 2-hydroxypropyl methacrylate, 3-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetraethylene glycol acrylate, para-vinyl benzyl alcohol, and mixtures thereof; with
   (b) one or more ethylenically unsaturated monomers selected from the group consisting of styrene, methyl, ethyl, butyl, lauryl, isobornyl, 2-ethyl hexyl, acrylates and methacrylates, and mixtures thereof; and with
   (c) dimethylaminoethylmethacrylate monomer.

6. The method of electrocoating of claim 5 wherein said self-crosslinking polymeric resin comprises the free radical addition polymerization product of:
   (a) 2-hydroxyethyl acrylate;
   (b) styrene and one or both of butyl acrylate and methyl methacrylate; and
   (c) dimethylaminoethylmethacrylate monomer.

* * * * *